(12) United States Patent
Kim

(10) Patent No.: US 12,087,304 B2
(45) Date of Patent: Sep. 10, 2024

(54) ELECTRONIC DEVICE FOR PROVIDING TEXT AND CONTROL METHOD THEREFOR

(71) Applicant: SAMSUNG ELECTRONICS CO., LTD., Suwon-si (KR)

(72) Inventor: Youngdae Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 336 days.

(21) Appl. No.: 17/497,668

(22) Filed: Oct. 8, 2021

(65) Prior Publication Data

US 2022/0028393 A1   Jan. 27, 2022

Related U.S. Application Data

(63) Continuation of application No. PCT/KR2020/004785, filed on Apr. 9, 2020.

(30) Foreign Application Priority Data

Apr. 16, 2019 (KR) .................. 10-2019-0044362

(51) Int. Cl.
*G10L 15/26* (2006.01)
*G10L 15/02* (2006.01)
(Continued)

(52) U.S. Cl.
CPC .............. *G10L 15/26* (2013.01); *G10L 15/02* (2013.01); *G10L 15/183* (2013.01); *G10L 15/22* (2013.01);
(Continued)

(58) Field of Classification Search
CPC ....... G10L 15/26; G10L 15/22; G10L 15/183; G10L 21/10; H04N 21/4884; H04N 21/488
See application file for complete search history.

(56) References Cited

U.S. PATENT DOCUMENTS 5,758,322 A * 5/1998 Rongley ................. G07C 9/37
704/E15.044
9,524,714 B2  12/2016 Choi et al.
(Continued)

FOREIGN PATENT DOCUMENTS

JP  5478478  2/2014
JP  2017-151198  8/2017
(Continued)

OTHER PUBLICATIONS

International Search Report for PCT/KR2020/004785, mailed Jul. 10, 2020, 4 pages.
(Continued)

*Primary Examiner* — Samuel G Neway
(74) *Attorney, Agent, or Firm* — Nixon & Vanderhye P.C.

(57) ABSTRACT

An electronic device for providing content including an image and a voice is disclosed. The electronic device comprises: a display configured to display an image; a memory in which a voice recognition module including various executable instructions is stored; and a processor configured to acquire expected words that will possibly be included in a voice, based on information about content, using the expected words to perform voice recognition for the voice through the voice recognition module, and displaying, on the display, text converted from the voice based on the voice recognition.

13 Claims, 11 Drawing Sheets

(51) Int. Cl.
*G10L 15/183* (2013.01)
*G10L 15/22* (2006.01)
*G10L 21/10* (2013.01)
*H04N 21/488* (2011.01)

(52) U.S. Cl.
CPC ............ *G10L 21/10* (2013.01); *H04N 21/488* (2013.01); *H04N 21/4884* (2013.01)

(56) References Cited

U.S. PATENT DOCUMENTS

| | | | | |
|---|---|---|---|---|
| 9,800,955 | B2* | 10/2017 | An | H04N 21/854 |
| 2004/0181391 | A1* | 9/2004 | Inoue | G10L 15/063 |
| | | | | 704/10 |
| 2007/0288950 | A1* | 12/2007 | Downey | H04N 21/25883 |
| | | | | 725/9 |
| 2007/0291910 | A1* | 12/2007 | Bucchieri | G09B 21/009 |
| | | | | 379/88.06 |
| 2010/0169095 | A1* | 7/2010 | Asano | G06F 16/685 |
| | | | | 704/251 |
| 2012/0029917 | A1* | 2/2012 | Chang | H04M 3/4936 |
| | | | | 704/235 |
| 2014/0046661 | A1* | 2/2014 | Bruner | H04N 21/6582 |
| | | | | 704/235 |
| 2015/0095929 | A1 | 4/2015 | Lee | |
| 2015/0098018 | A1* | 4/2015 | Starling | H04N 21/8126 |
| | | | | 348/468 |
| 2016/0034458 | A1* | 2/2016 | Choi | G10L 15/06 |
| | | | | 704/251 |
| 2017/0365251 | A1* | 12/2017 | Park | G10L 15/063 |
| 2022/0028393 | A1* | 1/2022 | Kim | G10L 15/183 |

FOREIGN PATENT DOCUMENTS

| | | |
|---|---|---|
| JP | 6555613 | 7/2019 |
| KR | 10-2004-0105396 | 12/2004 |
| KR | 10-2008-0086640 | 9/2008 |
| KR | 10-2013-0032655 | 4/2013 |
| KR | 10-2014-0130335 | 11/2014 |
| KR | 10-2016-0014926 | 2/2016 |
| KR | 10-1899588 | 9/2018 |
| KR | 10-2018-0119101 | 11/2018 |
| KR | 10-2070197 | 1/2020 |

OTHER PUBLICATIONS

Written Opinion of the ISA for PCT/KR2020/004785, mailed Jul. 10, 2020, 4 pages.

* cited by examiner

FIG. 3

 : KEYWORD

|ABC||REINVESTIGATION| TAKEN ON BY |SPECIAL INVESTIGATION TEAM|...
"SPEED IS MORE IMPORTANT"
AA DAILY NEWS 2017. 12. 30 A.M. 10 : 30

[NEWS 1] SO FAR, WITH RESPECT TO THE REINVESTIGATION OF |EX-VICE MINISTER KIM'S| CASE, METHODS SUCH AS ▶|ASSIGNING SPECIAL INVESTIGATION UNIT|▶|SPECIAL PROSECUTOR|▶|AD HOC PROSECUTOR| AND THE LIKE HAVE BEEN DISCUSSED. HOWEVER, THE AD HOC PROSECUTION METHOD IS POSSIBLE IF THE |INCUMBENT||PROSECUTOR| IS THE SUBJECT OF INVESTIGATION, AND BECAUSE |STANDING SPECIAL PROSECUTION| TAKES A SIGNIFICANT TIME UNTIL ITS INTRODUCTION...

MICHAEL MANN, FIRST PUBLIC APPEARANCE AFTER SEPARATION [MK PHOTO]
KM SPORTS | 2017. 12. 30 P.M. 01 : 00

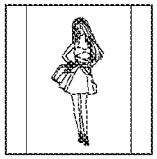

PARTICIPATED AT AN OPEN EVENT OF AN ITALIAN BRAND IN KOREA. MODEL MICHAEL MANN IS SEEN POSING. IDOL B CUT PHOTO COLLECTION▶ CLICK HOT!
NEWS © KMSPORTS&SPORTS.KM.CO.KR
UNLICENSED REPRODUCTION AND REDISTRIBUTION IS PROHIBITED

HEALTH AUTHORITIES, ENFORCING DIFFERENTIAL PRICING FOR BIOSIMILAR DRUGS...
BLOCKING FLOODING OF 'GENERIC' DRUGS
NEWSTOMA 2017. 12. 30 P.M. 05 : 00

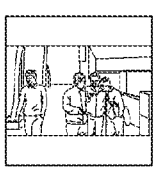

NEWSTOMA | GOVERNMENT, ON THE BIOSIMILAR DRUGS PRICING POLICY, ...
FROM THE PREVIOUS SAME PHARMACEUTICAL-SAME PRICE PRINCIPLE TO TIME AND COST INVESTMENT... FLOODING OF BIOSIMILAR DRUGS AND INADEQUATE QUALITY CONTROL OF RAW MATERIALS BEING PART OF THE CONTROVERSY.
SEJONG= © MULTIMEDIA NEWS AGENCY SPECIALIZING IN ECONOMY, NEWSTOMA

FIG. 4

| TYPE | KEYWORD |
|---|---|
| NEWS | METROPOLITAN AREA, MOUNTAINOUS AREA, BREAKING NEWS, PRESIDENT, PERSON A, PERSON B, CRIMES, SMARTPHONE, ... |
| SPORTS | SHOOT, 3-POINTER SHOOT, CROSS, STRIKER, GOAL-KEEPER, SON, HEUNG-MIN, LEBRON JAMES, LIONEL MESSI, DRIBBLE, ... |
| COOKING | SALT, SUGAR, AVOCADO, CHILI SAUCE, TARTAR SAUCE, BOIL SUFFICIENTLY, DELICIOUS, TABLESPOON, TEASPOON, BOWL, SMELL, CRISPY, POT, ... |
| ⋮ | ⋮ |

FIG. 5

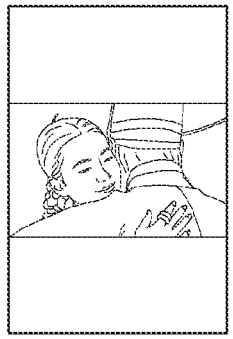

HER DIGNITY – EPISODE 11  PREVIOUS EPISODE | NEXT EPISODE
DATE OF BROADCAST 2018. 12. 06. (THURS) P.M. 10:00
VIEWER RATING 7.9%
SUB-HEADING DON'T TRUST ANYONE IN THE PALACE
CONTENT: "THIS IS THE FIRST TIME I LAUGHED IN MONTHS." CHULSOO OPENS HIS
    HEART TO YOUNGHEE WHO MAKES HIM LAUGH, WHILE APPROACHING MINSOO
    WHO IS TORMENTED ABOUT HIS PAST, AND GAINS HIS TRUST. AND A LONG
    DESIRED PLOT OF VENGEANCE BEGINS ITS ACT…

REPLAY

ELECTRONIC DEVICE FOR PROVIDING TEXT AND CONTROL METHOD THEREFOR

CROSS-REFERENCE TO RELATED APPLICATIONS

This application is a continuation of International Application No. PCT/KR2020/004785 designating the United States and filed Apr. 9, 2020, in the Korean Intellectual Property Receiving Office and claiming priority to Korean Patent Application No. 10-2019-0044362 filed Apr. 16, 2019, in the Korean Intellectual Property Office, the disclosures of which are incorporated by reference herein in their entireties.

BACKGROUND

Field

The disclosure relates to an electronic device which provides content. For example, the disclosure relates to an electronic device which provides subtitles and/or sign language for deaf persons by automatically recognizing speech included in a content.

Description of Related Art

Most broadcasting companies provide subtitled broadcast for deaf persons.

FIG. 1 is a diagram illustrating a view 20 of a stenographer typing in-person subtitles which match with speech in real-time to provide subtitles for deaf persons associated with content being broadcast in rea-time through a television 10 in a household. As a result thereof, subtitles 15 for deaf persons with the content being displayed may be verified.

Unlike FIG. 1, when content provided through the TV in the household is not content being broadcast in real-time, subtitles on the content may be pre-produced by a broadcasting company, or the like, and a stenographer may not be needed, but there is the disadvantage that there is still a need for human resource and cost to also produce subtitles directly even in this case.

As described above, because of the significant human resource or cost to producing and providing subtitles for deaf persons separately, only an extremely small portion of the contents being provided by the broadcasting companies include subtitles for deaf persons.

The TV in a typical household may, in general, rather than performing recognition on a speech included in the content directly, transmit data on the speech which is included in the content to a server, and receive a text (subtitles) converted from the corresponding speech from the server.

A module for speech recognition may be included in the TV itself, but because a database for increasing recognition accuracy of a speech recognition module is massive in volume, it is difficult to be embedded in the TV of the household.

Accordingly, even if the TV provides subtitles by recognizing the speech included in the content in real-time, there is a limit to the accuracy of the corresponding subtitles.

SUMMARY

Embodiments of the disclosure address at least the above-mentioned problems and/or disadvantages and to provide at least the advantages described below.

Embodiments of the disclosure provide an electronic device capable of increasing accuracy in recognition on a speech included in a content without using a database of a massive volume to increase speech recognition accuracy.

Embodiments of the disclosure provide an electronic device capable of automatically providing not only a text obtained according to speech recognition, but also a sign language image corresponding to the relevant text.

According to an example embodiment, an electronic device providing content including an image and a speech includes: a display configured to display the image, a memory storing a speech recognition module including various executable instructions, and a processor configured to: obtain an expected word with a possibility of being included in the speech based on information on the content, perform speech recognition on the speech through the speech recognition module using the expected word, and display in the display a text converted from the speech based on the speech recognition.

The processor may be configured to: determine a type of the content, determine a content broadcast or published within a pre-set period based on a point at which the content is broadcast from among different contents of a same type as with the type of the content, and obtain a word associated with the determined content as the expected word.

The processor may be configured to: determine a type of the content, and obtain an expected word corresponding to the type of the content from a database in which an expected word for respective types of content is stored.

The processor may be configured to: perform a search on the content, and obtain a keyword extracted from the search result as the expected word.

The processor may be configured to: determine content expected to be viewed based on information on a viewing history or viewing reservation of the electronic device, obtain a word associated with the determined content as the expected word, and perform, based on the determined content being displayed in the display, speech recognition on a speech of the content through the speech recognition module using the expected word.

The processor may be configured to: perform, based on there being an error present in the text displayed on the display, speech recognition on the speech using a different expected word similar with the expected word which was the basis of converting the text with the error from among a plurality of expected words obtained based on information on the content.

The processor may be configured to: update, based on there being an error present in the text displayed in the display, the expected word based on a word a user uploaded to a server with respect to the content.

The processor may be configured to: obtain one or more sign language images corresponding to the text, and control the display to display the obtained sign language image.

The electronic device further includes a communicator comprising communication circuitry, and the processor is configured to: identify, based on information on a sign language broadcast being received from an external device through the communicator, content corresponding to the sign language broadcast based on the received information on the sign language broadcast, control the display to display a list including the identified content, and control, based on a content included in the list being selected, the display to display a composite image in which an image of the selected content and an image of a sign language broadcast corresponding to the selected content are combined.

According to an example embodiment, a method of controlling an electronic device providing content including an image and a speech includes: displaying the image, obtaining an expected word with a possibility of being included in the speech based on information on the content, performing speech recognition on the speech through a pre-stored speech recognition module using the expected word, and displaying a text converted from the speech based on the speech recognition.

The obtaining the expected word may include: determining a type of the content, determining content broadcast or published within a pre-set period based on a point at which the content is broadcast from among different contents of a same type as with the type of the content, and obtaining a word associated with the determined content as the expected word.

The obtaining the expected word may include: determining a type of the content, and obtaining an expected word corresponding to the type of the content from a database in which an expected word for respective types of content is stored.

The obtaining the expected word may include: performing a search on the content, and obtaining a keyword extracted from the search result as the expected word.

The control method may further include: determining content expected to be viewed based on information on a viewing history or a viewing reservation of the electronic device, obtaining a word associated with the determined content as an expected word, and performing, based on the determined content being displayed in a display of the electronic device, speech recognition on a speech of the content through the speech recognition module using the expected word.

The method may further include: performing, based on there being an error present in the displayed text, speech recognition on the speech using a different expected word similar with the expected word which was the basis of converting the text with the error from among a plurality of expected words obtained based on information on the content.

The method may further include: updating, based on there being an error present in the displayed text, the expected word based on a word the user uploaded to a server with respect to the content.

The method may further include: obtaining one or more sign language images corresponding to the text, and displaying the obtained sign language image.

The method may include: identifying, based on information on a sign language broadcast being received from an external device, content corresponding to the sign language broadcast based on the received information on the sign language broadcast, displaying a list including the identified content, and displaying, based on a content included in the list being selected, a composite image in which an image of the selected content and an image of the sign language broadcast corresponding to the selected content are combined.

According to an example embodiment, a non-transitory computer-readable medium has stored thereon computer instructions which, when executed by a processor of an electronic device, cause the electronic device to perform operations including displaying, by an electronic device, content including an image and a speech, obtaining an expected word with a possibility of being included in the speech based on information on the content, performing speech recognition on the speech through a pre-stored speech recognition module including various executable instructions using the expected word, and displaying a text converted from the speech based on the speech recognition.

Various embodiments of the electronic device according provide accuracy of speech recognition that may be increased using words predicted to be obtained per viewed content without using a database of mass volume.

For example, even if the electronic device and not a server performs speech recognition on its own, it may bring significant development to the field of on-device speech recognition technology in terms of the accuracy of speech recognition per content increasing using expected words per content.

Accordingly, the electronic device and a control method thereof according to various example embodiments may not only improve a viewing environment of a deaf person, but also provide significant assistance in improving the viewing environment if it is an environment where hearing voices is difficult (outside where noise is loud, a space where silence is maintained, etc.) even when viewing is performed by non-disabled persons.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3 is diagram illustrating an example of obtaining an expected word from a content of a same type as with a corresponding content by taking into consideration a point of broadcast of the content according to various embodiments;

FIG. 4 is a diagram illustrating an example of using a pre-stored expected word according to a type of content according to various embodiments;

FIG. 5 is a diagram illustrating an example of obtaining an expected word using information on a content itself which is to be provided according to various embodiments;

DETAILED DESCRIPTION

Figure 1:
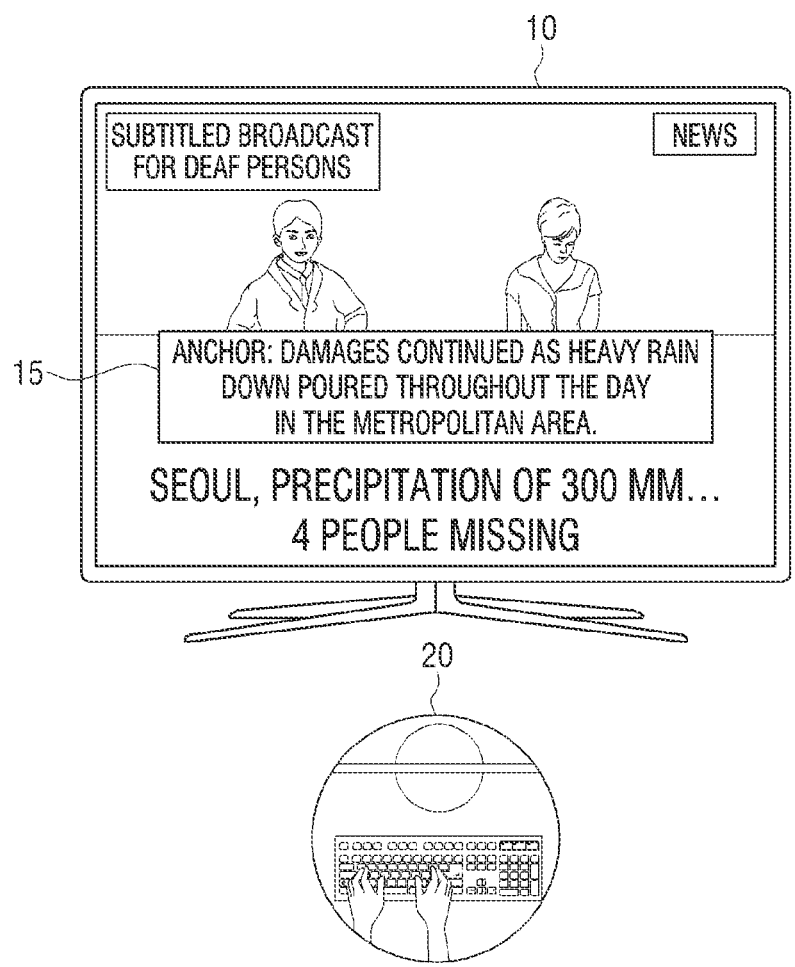
FIG. 1 is a diagram illustrating an example of providing subtitles for a deaf person in association with a real-time broadcast content of a related art.

Before describing the disclosure in detail, the description method of the disclosure and drawings will be described.

Terms used in describing the various example embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected. In this case, the meaning of the term may be interpreted as defined in the description, or if there is no specific definition of the term disclosed, the term may be interpreted based on the overall context of the disclosure and the technical common sense according to the related art.

Further, like reference numerals or signs disclosed in the accompanied drawings respectively indicate components or elements that perform substantially the same functions. For convenience of descriptions and understanding, the like reference numerals or symbols are used and described in one or more example embodiments different from one another. In other words, although elements having like reference numerals are all illustrated in a plurality of drawings, the plurality of drawings do not necessarily refer to one particular embodiment.

In addition, terms including ordinal numbers such as "first," and "second" are used to distinguish between elements in the description and the claims. The ordinal number is used to distinguish between identical or similar elements and it is to be understood that the meaning of the term is not be limited by the use of the ordinal number. In an example, an element coupled with the ordinal number is not to be limited by the number thereof in terms of the order of use, the arrangement order, or the like. If necessary, the respective ordinal numbers may be used interchangeably.

In the disclosure, a singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The terms such as a "module," a "unit," and a "part" used in the example embodiments are terms for denoting an element which perform at least one function or operation, and the element may be implemented with a hardware or software, or a combination of hardware and software. Further, a plurality of "modules," a plurality of "units," a plurality of "parts", and the like, except for a "module," a "unit," or a "part" which needs to be implemented to a specific hardware, may be integrated to at least one module or a chip and implemented in at least one processor.

In addition, according to an example embodiment, when a certain part is indicated as connected to another part, this includes not only direct connection, but also an indirect connection through a different medium. In addition, the meaning of when a certain part includes a certain element may refer, for example, to further including a different element and not excluding the other element, unless specifically described otherwise.

The disclosure will be described in greater detail below with reference to the accompanied drawings.

Figure 2:
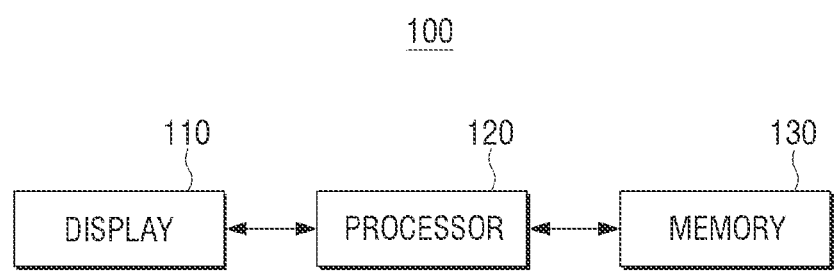
FIG. 2 is a block diagram illustrating an example configuration of an electronic device according to various embodiments.

FIG. 2 is a block diagram illustrating an example configuration of an electronic device according to various embodiments.

Referring to FIG. 2, the electronic device 100 may include a display 110, a processor (e.g., including processing circuitry) 120, and a memory 130.

The electronic device 100 may be implemented, for example, and without limitation, as a TV, a smart TV, a smartphone, a desktop personal computer (PC), a tablet PC, a kiosk, a PlayStation, and the like, and may provide various content which include an image and a voice.

The display 110 may be a configuration for displaying content provided through the electronic device 100, and may be implemented, for example, and without limitation, as a liquid crystal display (LCD), a plasma display panel (PDP), an organic light emitting diodes (OLED), a transparent OLED (TOLED), and the like.

The display 110 may be implemented in a touch screen form capable of detecting a touch manipulation of the user, and may be implemented as a foldable or bendable flexible display The processor 120 may include various processing circuitry and be configured to control the overall operation of the electronic device 100.

The processor 120 may include a random access memory (RAM; not shown), a read only memory (ROM; not shown), a central processing unit (CPU; not shown), a graphic processing unit (GPU; not shown), a system BUS (not shown), and the like, and may be configured to execute calculations or data processing associated with the control of other elements included in the electronic device 100.

The memory 130 may be a configuration for storing instructions or data associated with an operating system (OS) for controlling the overall operation of the elements of the electronic device 100 and elements of the electronic device 100.

The memory 130 may be implemented as a non-volatile memory (e.g., hard disk drive, sold state drive (SSD), flash memory), a volatile memory, and the like.

The memory 130 may store a speech recognition module. The speech recognition module may include various executable instructions configured to recognize a speech included in a content provided through the electronic device 100 or recognize a user voice.

The speech recognition module may be based on artificial intelligence technology.

The artificial intelligence technology may include machine learning (deep learning) and element technologies utilizing machine learning.

Machine learning may include an algorithm technology which classifies and learns on its own the characteristics of the input data, and element technology may, as a technology which simulates functions such as recognition and determination of a human brain by utilizing the machine learning algorithm such as deep learning, and include technical fields such as linguistic understanding, visual understanding, inference/prediction, knowledge representation, motion control, and the like. Among these, linguistic understanding may refer, for example, to technology which recognizes, applies, and processes human language and characters.

For example, the speech recognition module may include various executable instruction including, an acoustic model and a language model. The acoustic model may include information on a characteristic of a speech signal corresponding to a phoneme or a word, and the language model may include information corresponding to an arrangement order and relationship of at least one phoneme or word.

The processor 120 may be configured to extract various characteristics such as, for example, and without limitation, Linear Predictive Coefficient, Cepstrum, Mel Frequency Cepstral Coefficient (MFCC), Filter Bank Energy, and the like from the input speech signal, and compare the extracted characteristics with the acoustic model to recognize the phoneme included in the speech signal.

Further, the processor 120 may be configured to obtain, based on a result of modeling the relationship of linguistic order of recognized phonemes using the language model, a text corresponding to a word or a sentence.

Based on the method described above, the processor 120 may be configured to recognize the speech included in the content.

The content which is subject to speech recognition may include various content which may be provided at the present time through the electronic device 100 or provided at a later time.

For example, the content may correspond to a real-time content which includes an image currently being displayed or voice currently being output through the electronic device 100, or a content reserved for viewing by a user.

The content may also correspond to a content predicted to be viewed by the user through the electronic device 100 based on considering a viewing history. The viewing history may include information on a content viewed by the user through the electronic device 100 and/or information on content viewed by the corresponding user through one or more external devices.

The content may correspond to broadcast content of various channels which the electronic device 100 is capable of receiving from the outside and content which is pre-stored within the electronic device 100, and may be content which is stored in an external device connected with the electronic device 100 and provided through the electronic device 100.

Although, FIG. 2 illustrates the electronic device 100 as including the display 110, the electronic device according to the disclosure may be implemented, for example, and without limitation, as a set top box, a server, or the like, and may be configured to recognize speech included in the content which is provided from a separate display device connected through a input and output port (not shown) or a communicator (not shown).

The processor 120 according to an embodiment may be configured to obtain, based on information on a content, an expected word which may possibly be included in the speech included in the content in order to recognize the speech included in the content more accurately.

The information on the content may refer to a text and/or an image associated with the content, and include various elements such as a point of broadcast of the content or a point of providing the content, a type of the content (news, sports, shows, movies, documentaries, etc.), an attribute of the content (internet broadcast, TV broadcast (live broadcast/recorded broadcast/re-aired broadcast etc.), content pre-stored in the electronic device 100 or a recording medium, etc.), a content of the content, a title of the content, cast and characters of the content, subject of the content, and the like.

The processor 120 may be configured to extract the expected word from various texts or images included in the information on the content. The expected word may be extracted from the information on the content through an artificial intelligence model trained to extract one or more keywords from a plurality of texts.

The artificial intelligence model may include deep learning trained through various text data and keywords which are to be extracted therefrom.

The artificial intelligence model may be stored in the memory 130. When the processor 120 transmits information on the content to an external server (not shown), the expected word may be extracted from the information on the content through the artificial intelligence model stored in the external server, and the expected word extracted in this manner may be received back to the electronic device 100.

Referring to FIGS. 3 to 5, various examples of obtaining the expected word will be described using the information on the content.

In an example, the processor 120 may be configured to determine the type of the content, determine the content broadcast or published within a pre-set period based on the point at which the content is broadcast from among the different contents of the same type with the type of the content, and obtain the word associated with the determined content as the expected word.

The pre-set period may be variously pre-set such as, for example, and without limitation, within one hour or two hours, within a day, within a week, and the like based on the point at which the corresponding content is broadcast.

The type of the content may be varied such as, for example, and without limitation, news, sports, cooking, documentary, movie, show, drama, music broadcast, single-person broadcast, and the like.

FIG. 3 is diagram illustrating an example of obtaining an expected word from a content of a same type as with the corresponding content by taking into consideration a point of broadcast of the content according to various embodiments.

In FIG. 3, it may be assumed, for convenience of explanation, that the content to be provided through the electronic device 100 is a 7 p.m. news of Dec. 30, 2017. For example, FIG. 3 illustrates an example of obtaining the expected word in advance at the point the corresponding news is yet to be broadcast.

Referring to FIG. 3, the processor 120 may be configured to use information on news broadcast on Dec. 30, 2017, which is the same date as the corresponding news or which is uploaded on the web (news portal, broadcasting company website, etc.) at the corresponding date to obtain the expected word expected to be included in a speech of the 7 p.m. news to be broadcast later. The above takes into consideration headlines or main articles of news being nearly similar during the corresponding period.

Referring to FIG. 3, the processor 120 may be configured to obtain the expected word using a 10:30 a.m. article, a 1:00 p.m. article and a 5:00 p.m. article from among the news articles broadcast or published on Dec. 30, 2017.

Referring to FIG. 3, the processor 120 may use the content of the 10:30 a.m. article, and extract expected words such as 'ABC,' 'reinvestigation,' 'special investigation team,' 'ex-vice minister KIM,' 'incumbent,' 'prosecutor,' 'standing special prosecutor,' and the like.

In another example, the processor 120 may be configured to determine the type of the content, and obtain the expected word corresponding the type of the content from the database in which the expected words are stored per content type.

FIG. 4 is a diagram illustrating an example database in which expected words are stored according to a content type being shown in table form according to various embodiments.

Referring to FIG. 4, the processor 120 may use 'metropolitan area,' 'mountainous area,' 'breaking news,' 'president,' and the like as expected words in case the type of the content is 'news.' In case the type of content besides the above is 'sports,' words such as, for example, and without limitation, 'shoot,' 'three-pointer shoot,' 'cross,' 'striker,' 'goal keeper,' 'SON, Heung-min,' and the like may be used as the expected word.

In still another example, the processor 120 may be configured to perform a search on the content, and obtain the keyword extracted from a search result as the expected word.

FIG. 5 is a diagram illustrating an example of obtaining an expected word using information on the content itself according to various embodiments. In FIG. 5, it may be assumed that the content is an 'eleventh episode broadcast' of a drama called 'Her Dignity.'

Based on a search result on 'Her Dignity,' it may be confirmed that texts on a sub-heading and brief content appears as in FIG. 5, and the processor 120 may be configured to use the artificial intelligence model to obtain various keywords associated with the cast and characters (e.g., Younghee, Chulsoo, Minsoo), a location name (e.g., palace), a subject (e.g., revenge plot), and the like from the corresponding texts as the expected word using the artificial intelligence model.

At least two examples from among the examples described above through FIGS. 3 to 5 may be used simultaneously. For example, the processor 120 may be configured to obtain, in obtaining the expected word on 'Her Dignity' in FIG. 5, not only the expected words of FIG. 5, but also keywords corresponding to the 'drama' type in the database of FIG. 4 as the expected word.

The example embodiments described above through FIGS. 3 to 5 merely correspond to a portion of the examples of obtaining the expected word using the information on the content, and there may be various example embodiments using the information on the content to obtain the expected word in addition thereto.

When the expected word is obtained through the one or more embodiments described above, the processor 120 may be configured to perform speech recognition on the speech included in the content through the speech recognition module using the expected word. Further, the text converted from the speech based on speech recognition may be displayed in the display 110.

For example, the processor 120 may be configured to identify the text similar with the expected word from among text results of which the speech is recognized by the speech recognition module, and the identified text may be changed to the expected word.

For example, if the result of the speech recognition module recognizing speech using the acoustic module and the language model is '특별수사다' whereas '특별수사단' is among the expected words, the processor 120 may identify the recognition result as '특별수사단' rather than '특별수사다'.

The correlation between the phonemes which is recognizable by the speech recognition module may be pre-defined, and the processor 120 may be configured to correct the recognition result similar with either one expected word from among the obtained expected words as the corresponding expected word.

The recognition result and the expected word being similar with each other may be variously defined according to a method of speech recognition such as, a number of phonemes different from one another between the recognition result and the expected word being less than or equal to a pre-set number (e.g., only one), a difference in feature value defined by the acoustic model being within a pre-set range with respect to phonemes which are not matched with one another between the recognition result and the expected word, a difference between a feature of the speech signal corresponding to the expected word and a feature of the recognized speech being within a pre-set range, or the like, and is not limited thereto.

For example, based on comparing a specific expected word and a result of an initial speech recognition result, and if only one phoneme is different as in '특별수사다' and '특별수사단' and the phoneme that is different is a final consonant 'ㄴ,' the words may be determined as similar and the initial speech recognition result may be corrected as the corresponding expected word.

As described above, the determination on whether there is similarity between the recognition result and the expected word may be made based on a pre-set condition or based on an artificial intelligence model trained to determine similarity between words.

For example, if the initial speech recognition result is same as the specific expected word, the initial speech recognition result may be used as is.

For example, if the initial speech recognition result is not similar with any one from among the expected words, likewise, the initial speech recognition result may be used as is.

The example described above compares the speech recognition result which passed the acoustic model and the language model with the expected word, but training or updating the acoustic model and/or language model itself based on the expected word may also be assumed.

For example, based on expected words such as 'special investigation team,' and 'prosecutor,' being obtained according to information on the content, the processor 120 may be configured to adjust a variable value (e.g., weight) on combining 'special investigation team,' and 'prosecutor' with respect to combining a plurality of phonemes obtained from the speech of the content through the language model.

In comparing a before and after adjustment, even if most of the phonemes from among the plurality of phonemes included in, for example, the 'special investigation team' are recognized through the acoustic model under the same premise, a possibility that the result (recognition result) of combining the phonemes through the language model being 'special investigation team' may be higher after adjustment than prior to adjustment.

As described above, the content may be content reserved for viewing or content expected to be viewed based on viewing history in addition to the real-time content.

The processor 120 may be configured to determine the content expected to be viewed by the user based on information on the viewing history of the user or the viewing reservation of the electronic device 100, obtain a word associated with the determined content as the expected word, and perform speech recognition on the speech of the content through the speech recognition module using the expected word when the determined content is displayed in the display 110.

The process of recognizing speech, the process of obtaining the expected word, and the process of providing the content and the subtitles may all be performed on the electronic device 100, but at least one from among the corresponding processes may also be performed through one or more external devices which is not the electronic device 100.

Figure 6:
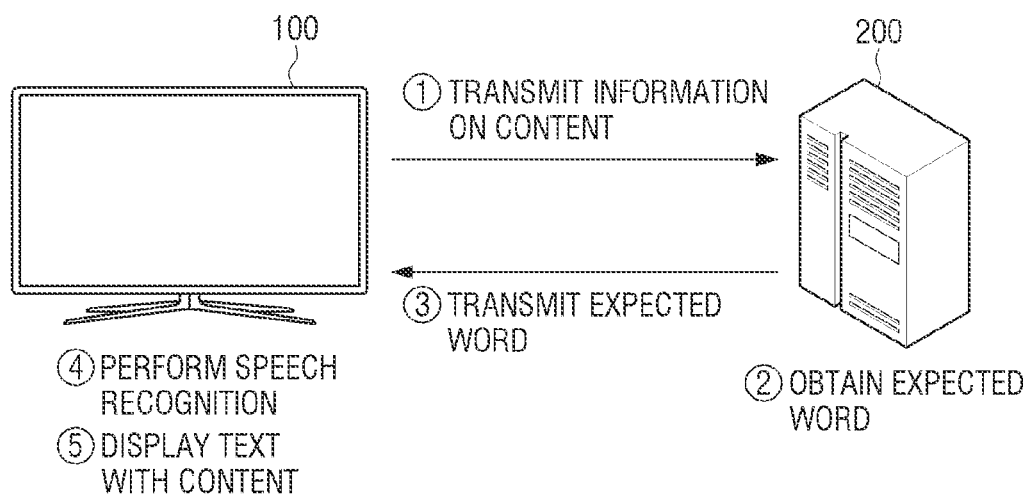
FIG. 6 is a diagram illustrating an example of performing speech recognition using an expected word which an electronic device including a speech recognition module is received from a server according to various embodiments.

FIG. 6 is a diagram illustrating an example of performing speech recognition using an expected word which an electronic device including a speech recognition module received from a server according to various embodiments.

Referring to FIG. 6, the electronic device 100, which is a TV, may transmit information on the content being displayed or to be displayed to a server 200 (①). The information on the content may include information on the channel to content is being broadcast, title of the content, episode number, and the like.

The server 200 which received the information on the content may use the information to obtain the expected word which is expected to be included in the speech of the content (②).

Based on the obtained expected word being received from the server 200 (③), the electronic device 100 may use the expected word to perform speech recognition on the voice included in the content (④), and display the text which is the result of speech recognition with the content (⑤).

In an example different from FIG. 6, the external server may be configured to obtain the expected word using information on the content, and after recognizing the speech which is to be included in the content using the obtained expected word, transmit the text which is the result thereof to the electronic device 100. In this case, the electronic device 100 may provide the received text with the content.

In another example, based on the electronic device 100 receiving content from a first server (not shown), the first server may transmit information on a content currently being viewed or to be viewed to a second server (not shown).

The second server may use the received information on the content to obtain the expected word and transmit to the electronic device 100. In this case, the electronic device 100 may perform speech recognition using the received expected word.

The second server may be configured to not only obtain the expected word, but also use the obtained expected word to recognize the speech of the content, and then transmit the result text of speech recognition to the electronic device 100.

As described above, the electronic device 100 may, by obtaining the text of which the speech included in the content is recognized through the one or more embodiments described above, provide the corresponding text with the content as subtitles for deaf persons.

The processor 120 may be configured to identify, based on a user input notifying that there is an error at a specific part from among the displayed text being received, the text part with the error, and correct the text with the error part. Alternatively, the processor 120 may be configured to compare the text within the image included in the previous content with the text which has been speech recognized, identify the error part of the speech recognized text, and correct the error part.

When the corresponding content is displayed again in the display 110, display the corrected text.

For example, the processor 120 may be configured to correct the expected word which is included in the text part with the error.

In this example, the processor 120 may be configured to perform, based on there being an error present in the text displayed in the display 110, speech recognition using a different expected word similar to the expected word which was the basis of converting the text with the error from among the plurality of expected words obtained based on information on the content.

The processor 120 may be configured to correct or update, based on there being an error present in the text displayed in the display 110, the expected word based on the word which the user uploaded to the server (not shown) with respect to the content.

In addition, the processor 120 may be configured to adjust the variable value of the acoustic model or the language model which corresponds to the text part with the error from among the speech recognition module. In this case, a function which recognizes a speech of a different content later on may also be improved.

The processor 120 may be configured to obtain one or more sign language images which correspond to text according to the speech recognition, and control the display 110 to display the obtained sign language image.

The memory 130 may store a plurality of sign language animation videos (respective vides include a plurality of images) which correspond to a plurality of sentences and/or a plurality of words, respectively.

For example, if the speech recognized text is "hello," the processor 120 may be configured to control the display 110 to display the sign language animation video (including a plurality of images) which corresponds to "hello."

The sign language animation video may show an avatar, a character, or the like performing sign language, and a pre-set sign language may be provided according to a nationality of the user of the electronic device 100, the nationality of the manufacturer of the electronic device 100, or the like.

Based, for example, on a user input notifying that there is an error in the sign language animation video being received, the error of the text (speech recognition result) which corresponds to the sign language animation video may be corrected according to the embodiments described above or the sign language image included in the sign language animation video may be corrected and stored.

Figure 7:
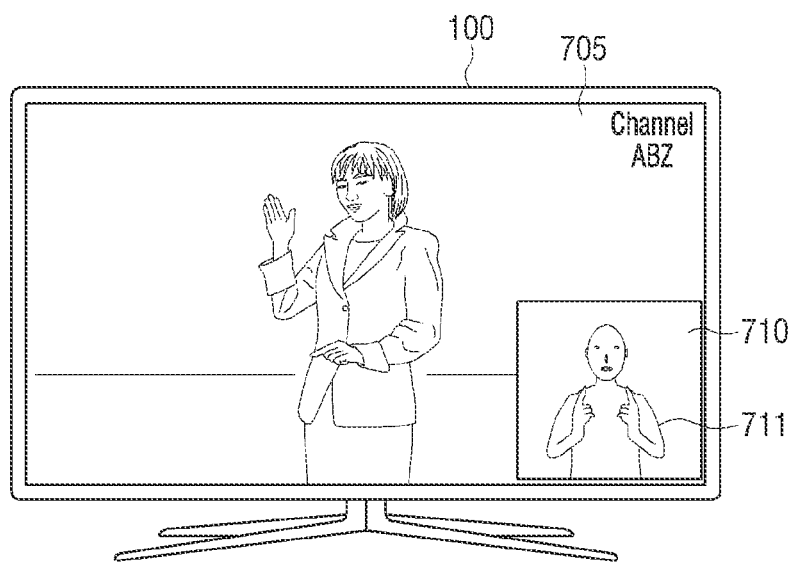
FIG. 7 is a diagram illustrating an example of providing a sign language image corresponding to text which is generated according to speech recognition according to various embodiments.

FIG. 7 is a diagram illustrating an example of providing a sign language image corresponding to text which is generated according to speech recognition according to various embodiments.

Referring to FIG. 7, the electronic device 100 may display a lecture content 705 while concurrently displaying a sign language image 710 which corresponds to the result text of recognizing the speech included in the lecture content 705.

The sign language image 710 shows an avatar 711 signing which corresponds to the speech of a lecturer who appears in the lecture content 705.

The electronic device 100 may, unlike in FIG. 7, not only display the sign language image 100, but also display the result text of recognizing the speech together therewith.

The electronic device may further include a communicator (e.g., including various communication circuitry) (not shown), and the processor 120 may be configured to identify, based on information on a sign language broadcast being received from the external device through the communicator, the content corresponding to the sign language broadcast based on the received information on the sign language broadcast. Further, the display 110 may be controlled to display a list including the identified content.

Based on the content included in the list being selected by a user command, a pre-set condition, or the like, the processor 120 may be configured to control the display 110 to display a composite image in which an image of a selected content and an image of a sign language broadcast which corresponds to the selected content are combined.

Figure 8A:
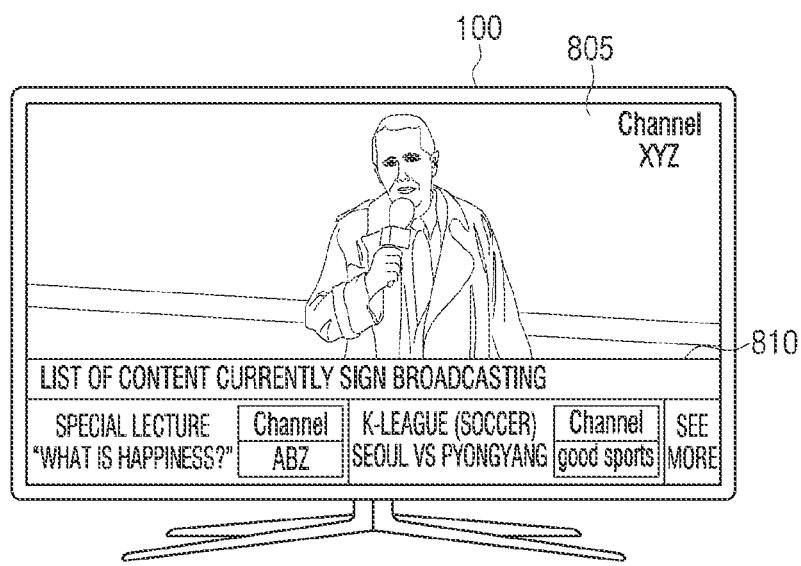
FIGS. 8A and 8B are diagrams illustrating an example of providing a user interface on a sign language broadcast according to various embodiments.
Figure 8B:
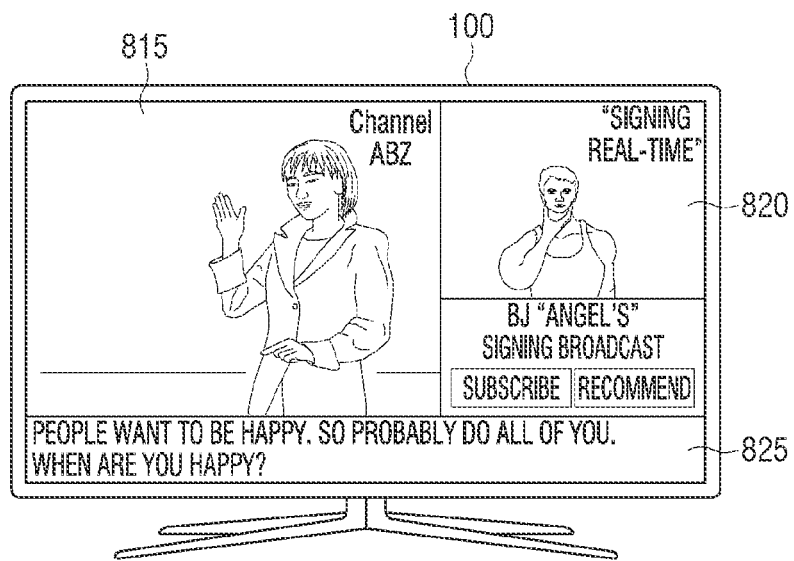

FIGS. 8A and 8B are diagrams illustrating an example of providing a user interface on a sign language broadcast according to various embodiments.

Referring to FIG. 8A, while the display of the electronic device 100 is displaying at least one content as in the image

805, the electronic device 100 may display a list 810 of content with which broadcast of the sign language may be provided.

The broadcast of sign language may be a broadcast content of a different user captured through a different electronic device, and the corresponding broadcast content may be received in the electronic device 100 through an external server (not shown).

In the case of content which is broadcast in real-time, because the broadcast of sign language is also to be provided in real-time, there is also the need to notify the user in advance whether the broadcast of sign language is to be provided prior to the broadcast of sign language being actually provided. Accordingly, if a different user who broadcasts content of sign language provides a notification that broadcast of sign language will be provided on a specific content of a specific date and time to the server in advance, the electronic device 100 may receive the corresponding information from the server and generate and display a list 810 of content.

In this example, the list 810 of content may include not only the content currently being broadcast, but also content to be broadcast later.

Referring to FIG. 8B, if the user selected the content a special lecture on "what is happiness?" from among the content included in the list 810, the electronic device 100 may convert, as in FIG. 8B, the broadcast receiving channel for providing the selected content 815 to 'ABZ,' while displaying the sign broadcast content 820 corresponding to the selected content together therewith.

In addition, referring to FIG. 8B, the text 825 according to the result of recognizing the speech included in the selected content 815 may be displayed therewith as subtitles.

The size and position of an area to which content and the sign broadcast which corresponds to the content are displayed on the display 110 are not limited to the drawing illustrated in FIG. 8B, and may be variously pre-set or changed by the user command. Unlike FIG. 8A, the text 825 may not be provided.

The processor 120 may be configured to determine, based on a communication speed and environment for receiving content, whether the pre-stored sign language image is to be provided or the sign broadcast content received externally is to be provided.

For example, if the communication speed and environment for receiving content is relatively favorable, the sign broadcast content received externally may be provided with the content, but if the communication speed and environment is not favorable, the sign language image pre-stored in the memory 130 may be provided.

Figure 9:
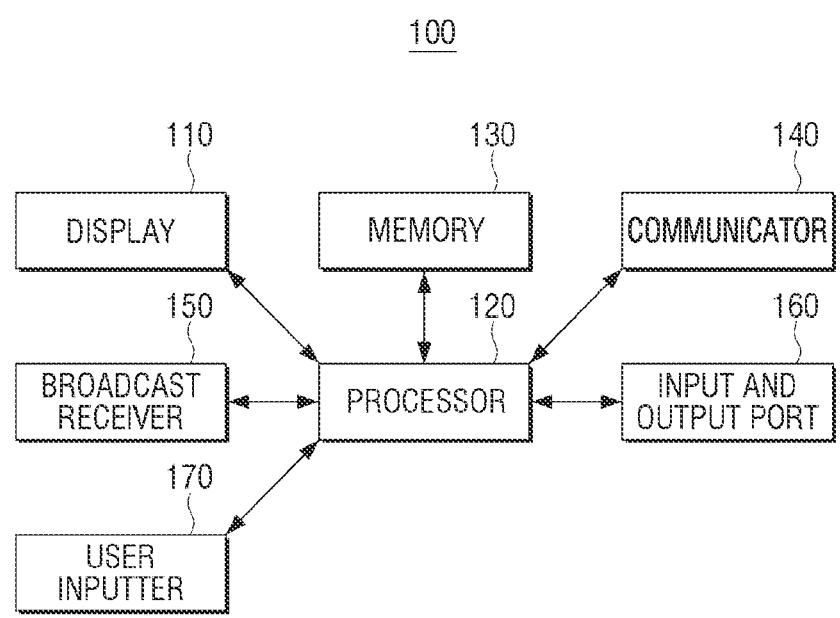
FIG. 9 is a block diagram illustrating an example configuration of an electronic device according to various embodiments.

FIG. 9 is a block diagram illustrating an example configuration of an electronic device according to various embodiments.

Referring to FIG. 9, the electronic device 100 may not only include the display 110, the processor 120, and the memory 130, but further include at least one from among a communicator (e.g., including processing circuitry) 140, a broadcast receiver 150, an input and output port 160, and a user inputter (e.g., including input circuitry) 170.

The communicator 140 may include various communication circuitry for performing wired or wireless data communication with the external device (not shown).

If data communication is performed with the external device by a wireless communication, the communicator 140 may include, for example, and without limitation, at least one from among a WIFI DIRECT communication module, a Bluetooth module, an infrared data association (IrDA) module, a Near Field Communication (NFC) module, a ZigBee module, a cellular communication module, a 3rd generation (3G) mobile communication module, a 4th generation (4G) mobile communication module, or a 4G Long Term Evolution (LTE) communication module.

If data communication is performed with the external device by a wired communication, the communicator 140 may include an interface module such as, for example, and without limitation, a USB, and may transmit and receive speech or image data by being physically connected with an external terminal device such as a PC through the interface module described above or transmit and receive firmware data for performing firmware upgrade.

The communicator 140 may include a first communicator (not shown) for transmitting and receiving data with a remote control device (not shown) and a second communicator (not shown) for transmitting and receiving data with an external server (not shown), separately. The first communicator (not shown) may be implemented with an Ethernet modem, a WIFI module, a Bluetooth module, and the like, while the second communicator may be implemented with a separate WIFI module.

Based on the electronic device 100 including the display 110, the communicator 140 may be configured to receive content from an external device such as a server. In addition, information on the content may be transmitted to the external device and the expected word may be received therefrom. In addition, the recognition result (text) on the speech included in the content may be received from the external device.

Based on the electronic device not including the display 110, the communicator 140 may receive content from the external device such as a server, while transmitting the corresponding content again to the external device such as a smartphone. The received content may be transmitted to the TV, the PC, or the like through the input and output port 160.

The broadcast receiver 150 may include various receiver circuitry configured to receive a signal on a broadcast content. The broadcast content may include an image, an audio, and additional data (e.g., EPG), and the broadcast receiver 150 may be configured to receive broadcast content signal from various sources such as terrestrial broadcasting, cable broadcasting, satellite broadcasting, internet broadcasting, and the like.

The broadcast receiver 150 may include, for example, and without limitation, a tuner (not shown), a demodulator (not shown), an equalizer (not shown), and the like for receiving broadcast content transmitted from a broadcasting company.

Through the input and output port 160, the electronic device 100 may receive a signal on an image and/or speech from the outside or transmit an image and/or speech signal to the outside.

The input and output port 160 may be implemented as a wired port such as, for example, and without limitation, a HDMI port, a display port, a RGB port, a Digital Visual Interface (DVI) port, a Thunderbolt, a component port, or the like. The input and output port 160 may be implemented as a port for wireless communication such as, for example, and without limitation, a WIFI or Bluetooth communication.

The input and output port 160 may be implemented as the HDMI port, the Thunderbolt, or the like and implemented to transmit the image and the speech signal together, but a first port which transmits the image signal and a second port which transmits the speech signal may each be implemented, separately.

The user inputter 170 may include various input circuitry which allows the electronic device 100 to receive a command or information from the user.

The user inputter 170 may include, for example, and without limitation, a touch panel (not show) implemented with the display 110 or a separate touch pad (not shown) to receive input of the user command or information by touch. The user inputter 170 may include a microphone (not shown) to receive input of the user command or information by speech.

The user inputter 170 may include, for example, one or more buttons, keyboards, mouses (not shown above), and the like to receive information from the user.

The electronic device 100 may adjust position, size, ratio, color, and the like on the display 110 to which the text according to speech recognition is to be displayed according to the user command received through the user inputter 170.

Based on the sign language image being provided, the electronic device 100 may adjust whether to provide an image on the sign language of which country, and the position, size, ratio, color, and the like on the display 110 to which the sign language image is to be displayed according to the user command received through the user inputter 170. In addition, through the user inputter 170, the user command for setting an avatar or a character appearing in the sign language image may also be received.

The electronic device 100 may also receive the selection command of the user on whether to activate (display) the text (speech recognition) and/or the sign language image on the content through the user inputter 170.

The user inputter 170 may include, for example, a camera, and the user may use the camera and the microphone to create content such as sign language broadcast on one's own.

The electronic device 100 may correct, based on the user command indicating an error being received through the user inputter 170, the error in the text and/or sign language image displayed with the content at the point the corresponding user command is received, and provide a text and/or sign language image which reflects the correction when the corresponding content or the related content is displayed.

An example method of controlling the electronic device according to various embodiments will be described in greater detail below with reference to FIG. 10.

Figure 10:
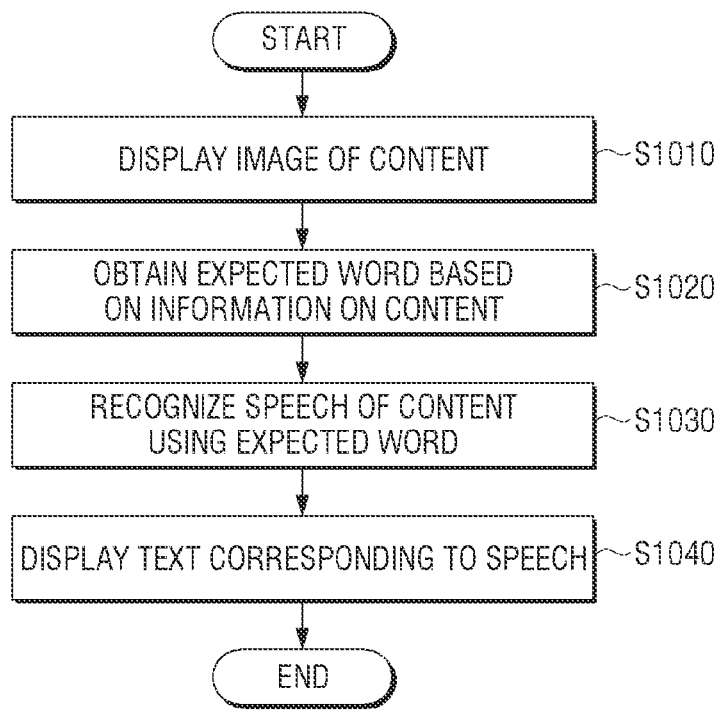
FIG. 10 is a flowchart illustrating an example method of controlling an electronic device according to various embodiments.

FIG. 10 is a flowchart illustrating an example method of controlling an electronic device according to various embodiments. The electronic device may be a device configured to provide content including images and voice.

Referring to FIG. 10, the method may display an image of a content (S1010).

The expected word with the possibility of being included in the speech of the content may be obtained based on information on the content (S1020).

The type of the content to be provided may be determined, the content broadcast within a pre-set period may be determined based on the point at which the content to be provided is broadcast from among the different contents of the same type as with the type of content to be provided, and the word associated with the determined content may be obtained as the expected word.

The type of the content to be provided may be determined, and the expected word which corresponds to the type of the corresponding content may be obtained from the database in which the expected word for respective types of content is stored.

A search on the content may be performed, and the keyword extracted from the search result may be obtained as the expected word.

Based on the expected word being obtained in the various methods as described in the examples above, the method may include performing, using the expected word, speech recognition on the speech of the content through the pre-stored speech recognition module (S1030).

The text converted from the speech of the content based on speech recognition may be displayed (S1040). For example, the text may be displayed with the image of the content.

The method may include determining content expected to be viewed by the user based on information on the viewing history or the viewing reservation of the user of the electronic device. Based on obtaining the word associated with the determined content as the expected word and the determined content being displayed in the display of the electronic device, speech recognition on the speech of the content may be performed through the speech recognition module using the obtained expected word.

The method may include performing, based on there being an error present in the displayed text, speech recognition using a different expected word similar to the expected word which was the basis of converting the text with the error from among the plurality of expected words obtained based on information on the content.

Based on there being an error present in the displayed text, the expected word may be updated based on the word which the user uploaded to the server with respect to the content.

The method may include obtaining one or more sign language images corresponding to the text, and displaying the obtained sign language image with the content.

In addition, the method may include identifying, based on information on a sign language broadcast being received from the external device, content corresponding to the sign language broadcast based on the received information on the sign language broadcast, displaying a list including the identified content, and displaying, based on the content included in the list being selected, a composite image in which the image of the selected content and the image of the sign language broadcast corresponding to the selected content are combined.

The method of the electronic device described above may be performed through the electronic device 100 which has been illustrated and described through FIGS. 2 to 9. The method may be performed through a system including the electronic device 100 and at least one external device (not shown).

The various example embodiments described above may be implemented in a recordable medium which is readable by a computer or a device similar to the computer using a software, a hardware, or a combination of the software and the hardware.

According to a hardware implementation, the example embodiments described in the disclosure may be implemented using at least one from among application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions.

In some cases, example embodiments described herein may be implemented by the processor 120 itself. According to a software implementation, example embodiments such as the procedures and functions described herein may be implemented with separate software modules. The respective software modules described above may perform one or more functions and operations described herein.

The computer instructions for performing processing operations in the electronic device 100 according to the one or more example embodiments described above may be stored in a non-transitory computer-readable medium. The computer instructions stored in this non-transitory computer-readable medium may cause a specific device to perform the processing operations in the electronic device 100 according to the various example embodiments described above when executed by the processor of the specific device.

The non-transitory computer readable medium may refer to a medium that stores data, and is readable by a device. Examples of the non-transitory computer readable medium may include, for example, and without limitation, a compact disc (CD), a digital versatile disc (DVD), a hard disc, a Blu-ray disc, a USB, a memory card, a ROM, and the like.

While the disclosure has been illustrated and described with reference to various example embodiments, it will be understood that the various example embodiments are intended to be illustrative, not limiting. It will be understood by those skilled in the art that various changes in form and detail may be made without departing from the true spirit and full scope of the disclosure, including the appended claims and their equivalents.

What is claimed is:

1. An electronic device configured to provide content comprising an image and a speech, the device, the electronic device comprising:
   a display configured to display the image;
   a memory storing a speech recognition module; and
   a processor configured to:
      obtain an expected word with a possibility of being included in the speech based on information on the content, perform speech recognition on the speech through the speech recognition module using the expected word, and display in the display a text converted from the speech based on the speech recognition,
      perform, based on there being an error present in the text displayed on the display, speech recognition on the speech using a different expected word similar to the expected word which was the basis of converting the text with the error from among a plurality of expected words obtained based on information on the content.

2. The electronic device of claim 1, wherein the processor is configured to: determine a type of the content, determine a content broadcast or published within a pre-set period based on a point at which the content is broadcast from among different contents of a same type as with the type of the content, and obtain a word associated with the determined content as the expected word.

3. The electronic device of claim 1, wherein the processor is configured to: determine a type of the content, and obtain an expected word corresponding to the type of the content from a database in which an expected word for respective types of content is stored.

4. The electronic device of claim 1, wherein the processor is configured to: perform a search on the content, and obtain a keyword extracted from the search result as the expected word.

5. The electronic device of claim 1, wherein the processor is configured to: determine content expected to be viewed based on information on a viewing history or viewing reservation, obtain a word associated with the content expected to be viewed as the expected word, and perform, based on the content expected to be viewed being displayed in the display, speech recognition on a speech of the displayed content through the speech recognition module using the expected word.

6. The electronic device of claim 1, wherein the processor is configured to: update, based on there being an error present in the text displayed in the display, the expected word based on a word a user uploaded to a server with respect to the content.

7. The electronic device of claim 1, wherein the processor is configured to: obtain one or more sign language images corresponding to the text, and control the display to display the obtained sign language image.

8. The electronic device of claim 1, further comprising:
   a communicator comprising communication circuitry,
   wherein the processor is configured to:
      identify, based on information on a sign language broadcast being received from an external device through the communicator, content corresponding to the sign language broadcast based on the received information on the sign language broadcast;
      control the display to display a list comprising the identified content; and
      control, based on a content included in the list being selected, the display to display a composite image in which an image of the selected content and an image of a sign language broadcast corresponding to the selected content are combined.

9. A method of controlling an electronic device providing content comprising an image and a speech, the method comprising:
   displaying the image;
   obtaining an expected word with a possibility of being included in the speech based on information on the content;
   performing speech recognition on the speech through a pre-stored speech recognition module using the expected word; and
   displaying a text converted from the speech based on the speech recognition,
   wherein the method further comprises performing, based on there being an error present in the displayed text, speech recognition on the speech using a different expected word similar with the expected word which was the basis of converting the text with the error from among a plurality of expected words obtained based on information on the content.

10. The method of claim 9, wherein the obtaining the expected word comprises: determining a type of the content, determining content broadcast or published within a pre-set period based on a point at which the content is broadcast from among different contents of a same type as with the type of the content, and obtaining a word associated with the determined content as the expected word.

11. The method of claim 9, wherein the obtaining the expected word comprises: determining a type of the content, and obtaining an expected word corresponding to the type of the content from a database in which an expected word for respective types of content is stored.

12. The method of claim 9, wherein the obtaining the expected word comprises: performing a search on the content, and obtaining a keyword extracted from the search result as the expected word.

13. The method of claim 9, further comprising:
- determining content expected to be viewed by a user based on information on a viewing history or a viewing reservation;
- obtaining a word associated with the content expected to be viewed as the expected word; and
- performing, based on the content expected to be viewed being displayed in a display of the electronic device, speech recognition on a speech of the displayed content through the speech recognition module using the expected word.

* * * * *